United States Patent [19]

Wooden et al.

[11] 4,297,394
[45] Oct. 27, 1981

[54] PIEZOELECTRIC POLYMER ANTIFOULING COATING AND METHOD OF USE AND APPLICATION

[75] Inventors: Bruce J. Wooden, Dickerson; Seymour Edelman, Silver Spring, both of Md.

[73] Assignee: The United States of America as represented by the Secretary of the Navy, Washington, D.C.

[21] Appl. No.: 132,607

[22] Filed: Mar. 18, 1980

Related U.S. Application Data

[63] Continuation-in-part of Ser. No. 44,130, May 31, 1979.

[51] Int. Cl.³ .......................... B05D 5/12; H01L 41/22
[52] U.S. Cl. ..................................... 427/100; 428/907; 428/422; 134/1; 106/18.35; 114/222; 422/6; 422/20; 43/124
[58] Field of Search .................. 252/62.9; 427/100; 428/907, 422; 134/1; 106/18.35; 114/222

[56] References Cited

U.S. PATENT DOCUMENTS

| 3,761,334 | 9/1973 | Zondek ........................... 428/907 |
| 3,798,473 | 3/1974 | Murayama et al. .................. 310/8 |
| 3,832,580 | 8/1974 | Yamamund et al. ................ 310/9.5 |
| 4,170,185 | 10/1979 | Murphy et al. ..................... 114/222 |

OTHER PUBLICATIONS

"Use of Piezoelectric Polymers to Prevent Marine Fouling", Murphy et al., Elsevien Scientific Publishing Co. (1979).
"Use of Piezoelectric Polymers to Prevent Marine Fouling", Studies in Electrical and Electronic Eng. 2 Wada et al., pp. 175-179 (1979).

*Primary Examiner*—George F. Lesmes
*Assistant Examiner*—E. Rollins Buffalow
*Attorney, Agent, or Firm*—R. S. Sciascia; William T. Ellis; Kenneth E. Walden

[57] ABSTRACT

An antifouling coating with method of use and method of application on marine structures in the form of a film containing piezoelectric polymer material, which, when electrically activated vibrates at a selected frequency to present a surface interfacing with water which is inhospitable for attachment of vegetable and animal life including free-swimming organisms thereby discouraging their attachment and their subsequent growth thereon to the macrofoulant adult stage.

12 Claims, 2 Drawing Figures

PIEZOELECTRIC POLYMER ANTIFOULING COATING AND METHOD OF USE AND APPLICATION

CROSS REFERENCE TO RELATED APPLICATION

This is a continuation-in-part of application Ser. No. 44,130 filed May 31, 1979.

BACKGROUND OF THE INVENTION

This invention relates to the field of marine antifoulants. It is particularly directed to a coating with method of use and method of application on marine structures such as ship hulls, sonar domes, condensers, piping, buoys, and other objects submerged in saltwater which discourages attachment thereto of inorganic and organic aggregates, followed by bacteria or algae and barnacles.

The coating is in the form of a thin film containing a piezoelectric polymer, which, when electrically activated, vibrates at its interface with water containing these organisms over frequency ranges and amplitudes inhospitable to their attachment whereby subsequent foulant build-up is minimized.

The problems of marine fouling on ship hulls and marine structures by organisms present in saltwater are long standing. The application of lead and copper cladding on ship hulls was an early attempt to prevent barnacle formation. More recent attempts at solving the problem are made by the application of toxic paints and coatings containing chemicals, such as, for example, cuprous oxides, sometimes with the addition of mercurial and other compounds, which slowly leached into the water for poisoning waterborne microorganisms. Examples of these and other efforts are discussed in U.S. Pat. Nos. 3,167,473; 3,684,752; 3,979,354; 4,075,319; and 4,082,709.

It has been found that the attachment of organisms, in particular barnacles, or a marine surface follows a definite progression. It is thought that the surface is preconditioned by the collection of a film of marine slime. Because of physico-chemical forces of the surface, organic and inorganic aggregatres adhere to it. These aggregates attract the bacteria and/or algae which will in a very short time colonize the surface. These bacteria are of the slimming type and thusly secrete mucoid-type compound. These materials form bridges binding the organisms to the surface. Once the slimming is established, pioneer species of macrofouling groups settle on it. These could be barnacles, tubeworms, hydroids, bryozoans and others, depending on the geographical area and time of year. After this stage of the fouling sequence, many other organisms attach to complete the fouling community. In this community of foulants the organism larvae are living free swimming in water. This stage is of short duration, and the larvae soon seek a suitable place for settlement and attachment. If the place of settlement is inhospitable, the larvae swim away to try attachment at another location. The entire development from free-swimming larvae to young barnacles takes only about 72 hours. It is during this period that the present invention is most effective.

The resultant effect of a concentration of plants and animals settling and attaching themselves to ships are well known. They contribute significantly to increased skin frictional resistance of the hull with resulting speed reduction and increased fuel consumption. This problem of marine growth (fouling) applies not only to vessels but also to other submerged objects. For example, fouling of sonar domes has been found to seriously limit the active and passive modes of operation of ship's acoustical systems especially by generating noises. Fouling of moored data acquisition systems by marine organisms impeded operations and necessitates frequent maintenance. Buoys shift due to the excessive weight of fouling organisms. Wood pilings in berthing facilities undergo structural weakening and ultimate destruction due to marine borer and fungal attack. The fouling of piping, piping couplings and fittings in the seawater intake piping systems including condensers, leads to reduced flow rates, valve seat damage, and accelerated metal corrosion. Concrete or ferro-cement or other similar structures are also adversely affected.

SUMMARY OF THE INVENTION

This invention is directed to a coating, method of use, and method of application to surfaces of marine structure's interfacing with water such as ship hulls, sonar domes, and buoys to discourage attachment thereto of free-swimming organisms (including cypris larvae) at their attaching stage, thus preventing their eventual growth thereon to their full size. The coatings disclosed in the invention are in the form of a thin film which may include plural layers of piezoelectric polymer secured to the water side of a marine structure. When an electrical signal, usually in the form of an alternating current, is applied through electrodes on opposite faces of the polymer there is induced vibration of the film at its water interface to present a surface inhospitable to the attachment of marine organisms.

OBJECTS OF THE INVENTION

Therefore, it is an object of this invention to disclose a coating for covering a marine structure to discourage the initial attachment of marine foulants.

It is another object of this invention to disclose a coating containing a piezoelectric polymer material, which, upon electrical activation, vibrates to present a surface in interface with water which marine microorganisms find inhospitable for attaching, thus preventing subsequent marine growth to macrofoulants.

It is still another object of the invention to disclose a method of application of such coating to marine structures.

The invention will become apparent upon considering the contents of the accompanying specifications and drawings.

DESCRIPTION OF THE PREFERRED EMBODIMENT

The present invention provides a novel arrangement of preventing foulant formation on marine structures, e.g. barnacles, by discouraging initial attachment of free-swimming larvae and spores during their relatively short settling stage. The surface of a marine structure such as a ship hull, buoy or sonar dome is made inhospitable for their attachment by applying a coating to the surface in the form of a thin film of piezoelectric polymer to which a current is applied in a manner for causing vibrations at the water interface.

Figure 1:
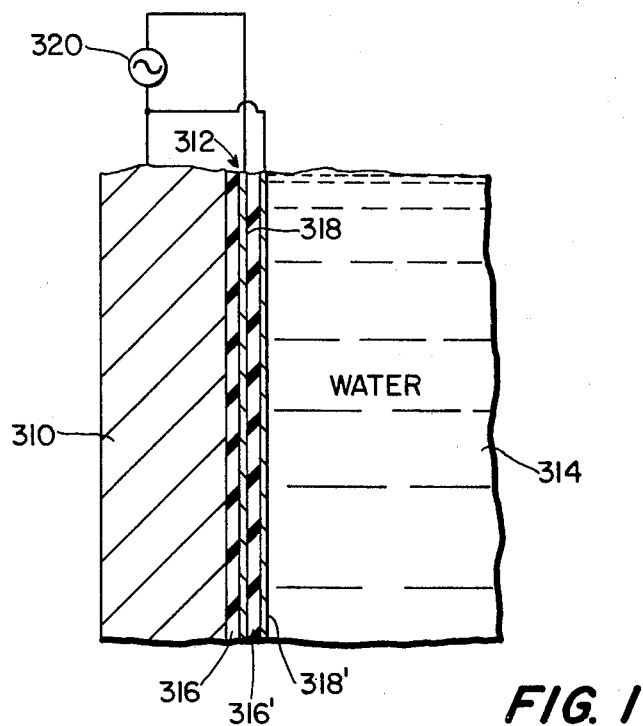
FIG. 1 is a cross-sectional view taken through a wall of a marine structure showing the antifouling coating in position thereon interfacing with water containing microorganisms.
Figure 2:
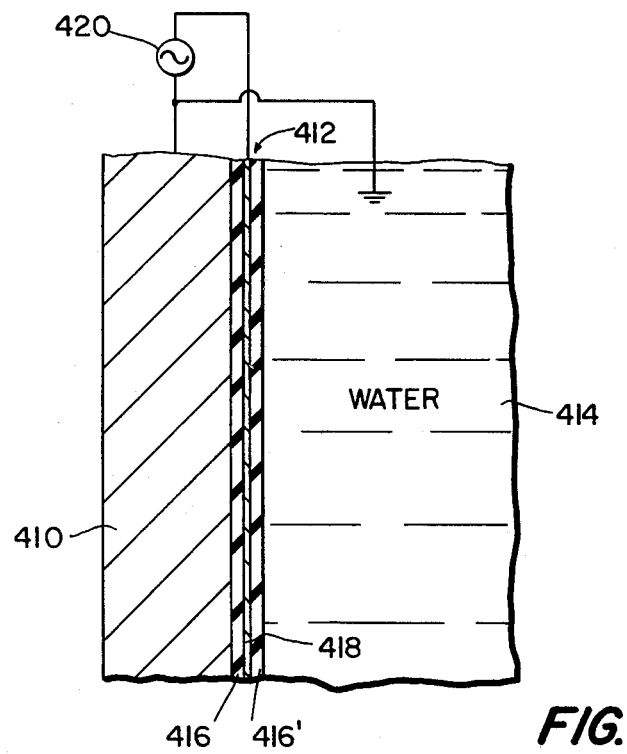
FIG. 2 is a cross-sectional view of an alternate embodiment of the invention.

Two embodiments of the invention are shown in FIGS. 1 and 2 of the drawing. In FIG. 1, there is shown a cross-section of a ship's plate or other marine structure 310 to which a coating 312, according to one form of the invention, is attached in facing relationship with water 314 containing organisms at a stage in life ready for attachment to a surface. Coating 312 is comprised of a film of plural layers of piezoelectric polymer such as poly(vinylidene fluoride) in the form of a film adhered by a conductive cement (not illustrated) to the surface of structure 310 in electrical contact therewith. Other piezoelectric polymeric materials such as polyvinyl fluoride or cellulose acetate butrate, for example, may be used in the coating.

The embodiment shown in FIG. 1, illustrates plural laminated sheets of polarized piezoelectric polymer 316, 316' sandwiched between conductive sheets or electrodes 318, 318' and structure 310, which also acts as an electrode, to define a layered coating or film designated generally by numeral 312. One lead from signal source 320 is connected to electrode 318 and the other lead is connected to both electrode 318' and structure 310 for activating the piezoelectric polymer material in layers 316, 316'.

An alternating current of selected frequency and wave form is applied from source 320 across electrode 318 to electrode 318' and structure 310, which acts an electrode, for activating the piezoelectric polymeric material layers therebetween for causing their vibration and vibration of the film at a resonance frequency in a direction substantially normal to the water interface. Because there are four to five hundred kind of species of barnacles in the world the frequency which must be employed ranges from around 100 Hz (even as low as 10 Hz) to several hundred megahertz. A sweep frequency may also be employed as no single frequency alone will be effective against all species. It may be found that for one species a low frequency and high amplitude is most effective while others react to a high frequency low amplitude. The wave form of the signal applied is preferably a periodic peaked nonsinusoidal wave wherein there is a quick reversal in direction at its peak voltage which tends to cause the coating to [flex] flick in a manner for throwing off would-be attaching bodies. The vibrations must occur from the very beginning and be operative all of the time fouling could occur. If this is not done, the surface may vibrate totally differently than intended. Slimming or remains of hard-shelled foulants attached to the surface may change the nature of the intended vibrations which may diminish the process or render it useless altogether. For example, free swimming barnacle-forming larvae present in the water find the vibrating surface inhospitable for attachment, hence they dislodge to try another surface. By this arrangement an essential inital step in barnacle formation is interrupted.

The FIG. 2 embodiment shows a coating 412 comprises of two layers 416 and 416' of piezoelectric polymer on either side of a common conductor sheet or electrode 418 which may be formed by an electrically conductive cement. Layer 416 is secured in physical and electrical contact with structure 410 while layer 416' interfaces with water 414. Signal generator 420 supplies an alternating current between electrode 418 and structure 410 on one side and water 414 on the other side for activating layers 416 and 416' for causing them to vibrate at a frequency at the water interface to discourage barnacle larvae attachment. FIG. 2 is essentially the disclosure of FIG. 1 without the outer or third layer of electrically conductive cement.

In each of the embodiments the ship's hull or structure receives one of the leads from the signal source and serves as one of the electrodes in cooperation with outwardly disposed electrode(s) for activating the sandwiched polymer layer. It may be advantageous to let the coated surface be subdivided into tracts each connected in parallel with its own potential separate from one another whereby a short circuit on one will not disrupt all.

There has been described herein coatings comprised of thin film of piezoelectric polymer, disposed in plural layers, against a marine structure wherein electrical activation causes vibrations thereof at its surface in interface with water for discouraging organism attachment.

To define an effective coating for a marine structure, such as a ship's hull, it is important that the film be secured continuously over substantially the entire outer or water facing surface. Continuous coating may be either uninterrupted or made up of discrete joining units covering the whole. The film vibrates at its water interface to render its surface inhospitable. A film in strips over a surface leaving uncovered areas as shown in U.S. Pat. No. 4,070,185 is not effective in preventing fouling on such uncovered areas. Piezoelectric polymer film is not sufficiently strong to cause effective hull vibrations between the strips to prevent fouling. Alternate rows of fouled and unfouled rows will result.

The first step in applying the coating or film, such as shown in FIG. 1, is to thoroughly clean the water facing surface of structure 310. This may be accomplished by means such as scrubbing, brushing, sand blasting, application of chemicals or combinations thereof. A thin layer of electrically conducting cement (not illustrated in FIG. 1), such as a silver filled epoxy which polymerized at around room temperature, is applied evenly over the cleaned surface by brushing or spraying. Before the cement (now defining an inner layer) hardens appreciably, the first layer of piezoelectric polymer 316 is applied over it and smoothed into position so as to adhere evenly over the structure. After the conductive layer (inner layer) on structure 310 has begun to harden, an intermediate layer or sheet of conductive cement 318 is applied to the outer face of the attached piezoelectric polymer layer 316 by brushing or spraying. A second layer of piezoelectric polymer 316' is then applied over intermediate layer of conductive cement 318 and smoothed into position. This intermediate layer of conductive cement is insulated from contact with seawater or inner layer. A third layer or sheet of conductive cement 318' may be applied to the seaward face of the second piezoelectric polymer layer, but is not necessary as hereinafter discussed. If applied, it defines an electrode in contact with the outer surface of the second piezoelectric polymer layer and with seawater when submerged. Considerations governing the choice of applying the outer layer of conductive cement which defines an electrode are discussed. The same procedure applies essentially to the FIG. 2 embodiment.

In the configuration of the coating described above, the two layers of polymer film are in parallel, electrically. The electrical driving signal is applied between the interediate layer of conductive cement and the combination of the inner and outer layers if the outer layer is applied or between the intermediate layer and the combination of the inner layer and the sea if the outer layer is not applied. The inner and outer layers or the inner layer and the sea are always at the same electric potential. The piezoelectric polymer films are oriented so that, when an electrical signal is applied as described above, both films undergo the same mechanical motion; that is, both contract for one polarity of the electrical signal and both expand for the other polarity.

The polymer layers may be applied over the structure or conductive layers by spraying. In this process, the polymer is applied in the form of fine powder particles which have been electrically charged to aid their adherence either to the structure or conductive layer. The powder is then heated to cause the particles to coalesce into a continuous sheet to define a layer. The polymer may be poled at this stage or after another layer of polymer has been applied.

It is assumed that in any situation where the piezoelectric polymer is used for minimizing fouling the underwater structure to which the coating is applied is very much stiffer than the polymer. The conductive cement is also stiffer than the polymer. On the other hand, the seawater is more compliant than the coating. Thus, the inner face of the polymer is held essentially stationary and the motion caused by the electrical signal will increase outward from the inner face of the coating if the wavelength of the vibration is more than four times the thickness of the coating.

If the coating is to be used in salt water, which is a good electrical conductor, it is better not to apply the outer layer of conductive cement so that the motion of the outer face of the coating is as nearly unimpeded as possible. If the coating is used in brackish or fresh water, where the electrical conductivity of the water is uncertain it is necessary to apply the outer layer to ensure good conductivity, even though the mass and stiffness of the outer layer reduce the desired motion to some extent.

The process described above can be repeated so that the coating consists of multiple pairs of piezoelectric polymer films, each pair having an insulated central layer of conductive cement and with the outer surfaces of each pair at a common electrical potential. This arrangement allows the motion of the seaward surface of the coating to be many times the motion produced by any one pair of films.

Two embodiments of the invention have been disclosed, along with a method of application. It is obvious that further embodiments and modifications may be made without departing from the spirit of the invention which is limited only by the scope of the claims herein.

What is claimed is:

1. A method of coating the outer surface of an electrically conductive marine structure with a plural layer continuous film for reducing fouling thereon comprising the steps of:
   preparing the surface of the structure to insure maximum electrical conductivity;
   applying a layer of electrically conductive cement to substantially the entire outer surface to be contacted by water containing fouling organisms;
   applying a continuous layer of piezoelectric polymer over the cement;
   applying another layer of electrically conductive cement to the polymer layer; and
   applying another continuous layer of piezoelectric polymer for interfacing with water.

2. The method according to claim 1 including an additional step of applying a layer of electrically conductive cement on the last layer of polymer to define an electrode therefor.

3. The method according to claim 1 wherein the surface is prepared by sandblasting.

4. The method according to claim 1 wherein the cement is applied by spraying.

5. A method of coating the outer surface of a steel hull ship with a multi-layer film having characteristics to reduce marine fouling thereon comprising the steps of:
   providing the ship out of water;
   cleaning substantially the entire outer surface of the hull to insure maximum electrical conductivity;
   applying a first continuous layer of electrically conductive cement over substantially the entire cleaned surface expected to normally come in contact with water containing fouling organisms;
   spraying a continuous layer of statically charged fine grain dry piezoelectric polymer on the conductive coating and applying heat to coalesce;
   applying a second layer of electrically conductive cement over the polymer layer;
   spraying a continuous layer of statically charged fine grain dry piezoelectric polymer on the second layer of conductive cement and applying heat to coalesce; and
   poling the polymer layers.

6. The method according to claim 5 wherein the layers of polymer are poled individually.

7. The method according to claim 5 wherein the polymer layers are poled simultaneously.

8. The method according to claim 5 wherein the hull cleaning step includes sandblasting.

9. The method according to claim 5 wherein the conductive cement is applied by spraying.

10. The method according to claim 5 including an additional step of applying an electrically conductive layer on the outer water facing layer of polymer to define an electrode therefor.

11. The method according to claim 10 wherein the conducting layer is applied by spraying.

12. The method according to claim 5 wherein the ship is provided out of water by drydocking.

* * * * *